(12) United States Patent
Xing et al.

(10) Patent No.: US 10,759,443 B2
(45) Date of Patent: Sep. 1, 2020

(54) SYSTEM AND METHOD FOR DETECTING PARASTIC POWER CIRCULATION WITHIN A WORK VEHICLE

(71) Applicant: CNH Industrial America, LLC, New Holland, PA (US)

(72) Inventors: Yun Xing, Willowbrook, IL (US); Patrick Thomas Dean, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 387 days.

(21) Appl. No.: 15/442,888

(22) Filed: Feb. 27, 2017

(65) Prior Publication Data

US 2018/0244282 A1    Aug. 30, 2018

(51) Int. Cl.
*B60W 50/02* (2012.01)
*B60W 40/12* (2012.01)
*E02F 9/20* (2006.01)
*E02F 9/26* (2006.01)
*E02F 3/28* (2006.01)

(52) U.S. Cl.
CPC ........ *B60W 50/0225* (2013.01); *B60W 40/12* (2013.01); *B60W 50/0205* (2013.01); *E02F 9/2079* (2013.01); *E02F 9/26* (2013.01); *B60W 2050/021* (2013.01); *B60W 2300/152* (2013.01); *B60W 2400/00* (2013.01); *B60W 2510/104* (2013.01); *B60W 2510/1035* (2013.01); *B60W 2900/00* (2013.01); *E02F 3/283* (2013.01)

(58) Field of Classification Search
CPC ............ B60W 40/12; B60W 50/0205; B60W 50/0225; B60W 2050/021; B60W 2300/152; B60W 2400/00; B60W 2510/1035; B60W 2510/104; B60W 2900/00; E02F 3/283; E02F 9/2079; E02F 9/26

See application file for complete search history.

(56) References Cited

U.S. PATENT DOCUMENTS

| 7,530,263 B2 | 5/2009 | Sowle |
| 7,693,642 B2 | 4/2010 | Anderson et al. |
| 8,095,287 B2 | 1/2012 | Beechie et al. |
| 8,326,499 B2 | 12/2012 | Sopko, Jr. et al. |
| 8,897,983 B2 | 11/2014 | Stander et al. |
| 8,938,343 B2 | 1/2015 | Jensen |
| 2015/0307077 A1 | 10/2015 | Xing et al. |

*Primary Examiner* — Jerrah Edwards
(74) *Attorney, Agent, or Firm* — Peter Zacharias; Patrick Sheldrake

(57) ABSTRACT

A method for detecting parasitic power circulation within a work vehicle may include controlling an operation of the work vehicle such that a transmission of the work vehicle has a first output speed and determining a first power value associated with power transmitted through a drive shaft of the work vehicle at the first output speed. The method may also include adjusting the operation of the work vehicle such that the transmission has a second output speed that differs from the first output speed and determining a second power value associated with power transmitted through the drive shaft at the second output speed. In addition, the method may include comparing the first and second power values to a predetermined relationship to determine whether the work vehicle is currently experiencing parasitic power circulation, wherein the predetermined relationship is associated with operation of the work vehicle without parasitic power circulation.

20 Claims, 5 Drawing Sheets

SYSTEM AND METHOD FOR DETECTING PARASITIC POWER CIRCULATION WITHIN A WORK VEHICLE

FIELD OF THE INVENTION

The present subject matter relates generally to work vehicles and, more particularly, to a system and method for detecting parasitic power circulation with a work vehicle.

BACKGROUND OF THE INVENTION

Four-wheel drive work vehicles, such as wheel loaders, tractors, and the like, typically include a drivetrain with front and rear drive axles that deliver power from the engine to the front and rear wheels or tires of the vehicle. During normal operating conditions, the drive torque transmitted through the front and rear drive axles is in the same direction such that both the front and rear tires are operating in a "driving" mode. However, in certain instances, the drive torque transmitted through the front and rear drive axles may be in opposite directions, leading to parasitic power circulation within the vehicle's drivetrain. Such parasitic power circulation is often the result of differing effective radii between the front and rear tires of the work vehicle, which causes different tire slippage between the front and rear tires and places one pair of tires in a "sliding" or "braking" mode relative to other pair of tires.

Parasitic power circulation is not an additional power source through the drivetrain, but, rather, corresponds to a power loss or waste of engine power and induces an additional load on the drivetrain. As such, parasitic power circulation leads to increased tire wear and can increase the likelihood of failure of one or more of the drivetrain component due to overloading. Moreover, given that parasitic power circulation is an additional load on the engine, such power circulation increases fuel consumption, thereby leading to reduced fuel efficiency for the work vehicle.

Accordingly, a system and method for accurately and efficiently detecting parasitic power circulation occurring within the drivetrain of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for detecting parasitic power circulation within a work vehicle. The method may include controlling, with one or more computing devices, an operation of the work vehicle such that a transmission of the work vehicle has a first output speed and determining, with the computing device(s), a first power value associated with power transmitted through a drive shaft of the work vehicle at the first output speed of the transmission. The method may also include adjusting, with the computing device(s), the operation of the work vehicle such that the transmission has a second output speed that differs from the first output speed and determining, with the computing device(s), a second power value associated with power transmitted through the drive shaft at the second output speed of the transmission. In addition, the method may include comparing, with the computing device(s), the first and second power values to a predetermined relationship to determine whether the work vehicle is currently experiencing parasitic power circulation, wherein the predetermined relationship is associated with operation of the work vehicle without parasitic power circulation.

In another aspect, the present subject matter is directed to a system for detecting parasitic power circulation within a work vehicle. The system may include a drivetrain having an engine and a transmission operatively coupled to the engine. The drivetrain may further include a front drive axle for delivering power from the engine to front tires of the work vehicle and rear drive axle for delivering power from the engine to rear tires of the work vehicle. The system may also include a controller having a processor and associated memory. The memory may store instructions that, when executed by the processor, configure the controller to control an operation of the work vehicle such that the transmission has a first output speed and determine a first power value associated with power transmitted through at least one of the front drive shaft or the rear drive shaft at the first output speed of the transmission. The controller may also be configured to adjust the operation of the work vehicle such that the transmission has a second output speed that differs from the first output speed and determine a second power value associated with power transmitted through the at least one of the front drive shaft or the rear drive shaft at the second output speed of the transmission. In addition, the controller may be configured to compare the first and second power values to a predetermined relationship to determine whether the work vehicle is currently experiencing parasitic power circulation, wherein the predetermined relationship is associated with operation of the work vehicle without parasitic power circulation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
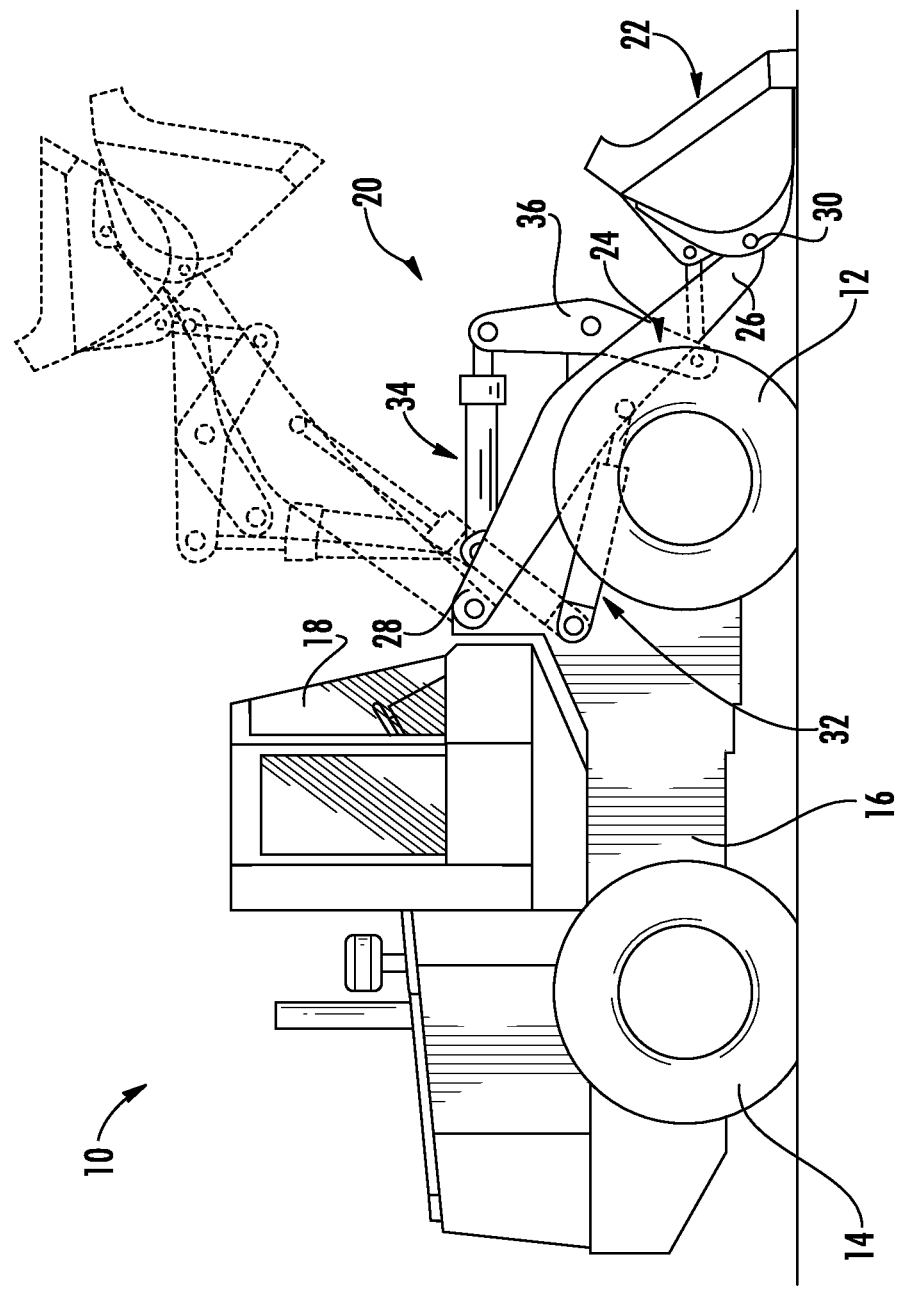
FIG. 1 illustrates a side view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for detecting parasitic power circulation occurring within a drivetrain of a work vehicle. Specifically, in several embodiments, a controller of the work vehicle may be configured to function as a "soft" sensor for detecting parasitic power circulation. For example, as will be described below, in one embodiment, the controller may include a predetermined relationship stored within its memory that relates the output speed of the transmission to a corresponding power value associated with the power being transmitted through one or more of the drive shafts of the vehicle's drivetrain. In accordance with one aspect of the present subject matter, the predetermined relationship may be associated with operation of the work vehicle when parasitic power circulation is not occurring within the drivetrain. As such, when it is determined that the relationship is not satisfied, the controller may identify that the work vehicle is currently experiencing parasitic power circulation and may implement a control action or strategy to address such power circulation. As a result, parasitic power circulation within the drivetrain may be reduced or eliminated, thereby maintaining the desired vehicle operating condition, reducing fuel consumption, and preventing the components of the drivetrain from being overloaded.

Referring now to the drawings, FIG. 1 illustrates a side view of one embodiment of a work vehicle 10 in accordance with aspects of the present subject matter. As shown, the work vehicle 10 is configured as a wheel loader. However, in other embodiments, the work vehicle 10 may be configured as any other suitable work vehicle known in the art, such as any other four-wheel drive off-highway vehicle, such as an agricultural vehicle and/or the like.

As shown, the work vehicle 10 includes a pair of front tires 12, (one of which is shown), a pair of rear tires 14 (one of which is shown) and a frame or chassis 16 coupled to and supported by the tires 12, 14. An operator's cab 18 may be supported by a portion of the chassis 16 and may house various input devices for permitting an operator to control the operation of the work vehicle 10. As will be described below with reference to FIG. 2, the work vehicle 10 may also include a drivetrain 102 for delivering engine power to the tires 12, 14 for driving the vehicle 10.

Moreover, as shown in FIG. 1, the work vehicle 10 may include a lift assembly 20 for raising and lowering a suitable implement 22 (e.g., a bucket) relative to a driving surface of the vehicle 10. In several embodiments, the lift assembly 20 may include a pair of loader arms 24 (one of which is shown) pivotally coupled between the chassis 16 and the implement 22. For example, as shown in FIG. 1, each loader arm 24 may include a forward end 26 and an aft end 28, with the forward end 26 being pivotally coupled to the implement 22 at a forward pivot point 30 and the aft end 28 being pivotally coupled to a portion of the chassis 16.

In addition, the lift assembly 20 may also include a pair of hydraulic lift cylinders 32 (one of which is shown) coupled between the chassis 16 and the loader arms 24 and a hydraulic tilt cylinder 34 coupled between the chassis 16 and the implement 22 (e.g., via a pivotally mounted bell-crank 36 or other mechanical linkage). It should be readily understood by those of ordinary skill in the art that the lift and tilt cylinders 32, 34 may be utilized to allow the implement 22 to be raised/lowered and/or pivoted relative to the driving surface of the work vehicle 10. For example, the lift cylinders 32 may be extended and retracted in order to pivot the loader arms 24 upward and downwards, respectively, thereby at least partially controlling the vertical positioning of the implement 22 relative to the driving surface. Similarly, the tilt cylinder 34 may be extended and retracted in order to pivot the implement 22 relative to the loader arms 24 about the forward pivot point 30, thereby controlling the tilt angle or orientation of the implement 22 relative to the driving surface.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Figure 2:
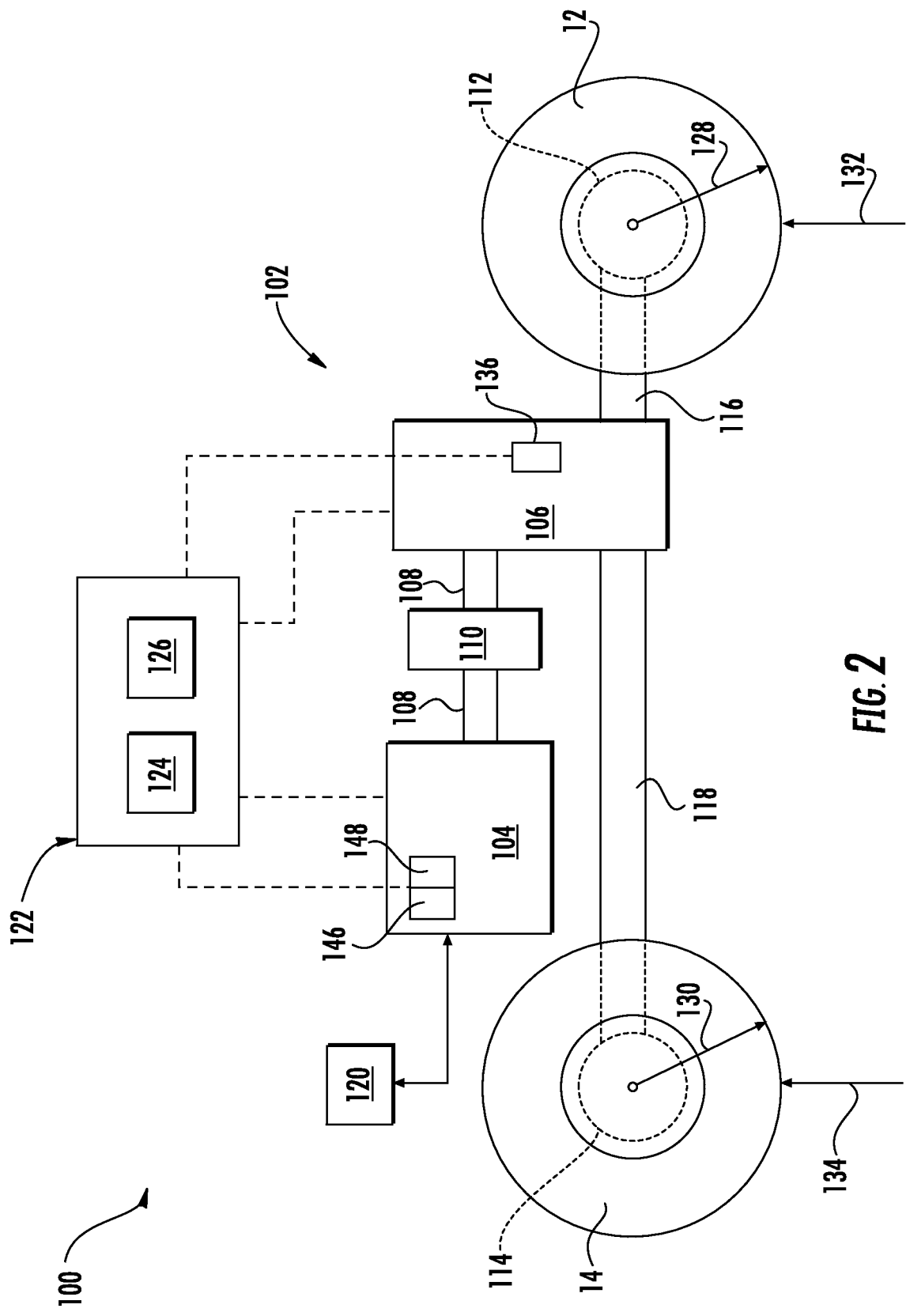
FIG. 2 illustrates a simplified, schematic view of one embodiment of a system for detecting parasitic power circulation within a work vehicle in accordance with aspects of the present subject matter, particularly illustrating the system including components of a drivetrain of the work vehicle.

Referring now to FIG. 2, a schematic, simplified view of one embodiment of a system 100 for detecting parasitic power circulation within a work vehicle is illustrated in accordance with aspects of the present subject matter. In general, the system 100 will be described herein with reference to the work vehicle 10 shown in FIG. 1. However, it should be appreciated that the disclosed system 100 may be utilized with any other suitable work vehicles to allow for the detection of parasitic power circulation.

As shown in FIG. 2, in several embodiments, the system 100 may include a drivetrain 102 for transferring engine power to the front and rear tires 12, 14 for driving the work vehicle 10. As shown, the drivetrain 102 may generally include an engine 104 and a transmission 106 configured to be mounted on the chassis 16 (FIG. 1) of the work vehicle 10. In one embodiment, the transmission 106 may be operably coupled to the engine 104 via one or more output shafts 108 and an associated torque converter 110. As is generally understood, the transmission 106 may be configured to provide variably adjusted gear ratios for transferring engine power to associated front and rear axles 112, 114 of the work vehicle 10. For example, as shown in FIG. 2, engine power may be transferred to the front axle 112 via a front drive shaft 116 rotationally coupled to the transmission 106, with such power being transmitted through the front axle 112 to drive the front wheels 12. Similarly, engine power may be transferred to the rear axle 114 via a rear drive shaft 118 rotationally coupled to the transmission 106, with such power being transmitted through the rear axle 114 to drive the rear wheels 14. As shown in FIG. 2 the engine 104 may also be coupled directly or indirectly to one or more power-consuming accessories 120 of the work vehicle 10, such as an alternator, one or more hydraulic components, and/or any other suitable power-consuming accessories.

In addition, the system 100 may include a controller 122 configured to control the operation of one or more components of the work vehicle 10, such as the engine 104 and the transmission 106. For example, the controller 122 may be communicatively coupled to an engine governor or engine control unit (ECU) (not shown) in order to control and/or monitor the speed and/or torque output of the engine 104. Similarly, the controller 122 may be communicatively coupled to one or more transmission components (not shown) to control the operation of the transmission 106. For instance, the controller 122 may be configured to transmit suitable current commands to one or more clutch valves (not shown) to control the engagement/disengagement of one or more clutches (not shown) provided in operative associated within the transmission 106.

It should be appreciated the controller 122 may generally comprise any suitable processor-based device known in the art, such as one or more computing devices. Thus, in several embodiments, the controller 122 may include one or more processor(s) 124 and associated memory device(s) 126 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 126 of the controller 122 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 126 may generally be configured to store suitable computer-readable instructions that, when implemented by the processor(s) 124, configure the controller 122 to perform various computer-implemented functions, such as performing the various calculations described herein and/or implementing the flow diagrams described below with reference to FIGS. 4 and 5. In addition, the controller 122 may also include various other suitable components, such as a communications circuit or module, one or more input/output channels, a data/control bus and/or the like.

It should also be appreciated that the controller 122 may correspond to an existing controller of the work vehicle 10 (e.g., an existing engine and/or transmission controller) or the controller 122 may correspond to a separate controller. For instance, in one embodiment, the controller 122 may form all or part of a separate plug-in module that may be installed within the work vehicle 10 to allow for the disclosed system and method to be implemented without requiring additional software to be uploaded onto existing control devices of the vehicle 10.

As shown in FIG. 2, each tire 12, 14 of the work vehicle 100 may generally define a rolling or effective tire radius. For instance, each front tire 12 may define an effective front tire radius 128 and each rear tire 14 may define an effective rear tire radius 130. In general, the effective tire radius 128, 130 of each tire 12, 14 may depend on numerous factors, such as the tire pressure, the wear condition(s) of the tires 12, 14, the weight distribution of the work vehicle 10, and/or the like. For instance, as shown in FIG. 2, due to the weight of the work vehicle 10, a vertical load may be applied to each tire 12, 14, such as a front vertical load applied to the front tires 12 (e.g., as indicated by arrow 132) and a rear vertical load applied to the rear tires 14 (e.g., as indicated by arrow 134).

Typically, when the effective tire radii 128, 130 of the front and rear tires 12, 14 are the same, the work vehicle 10 may be operated without any parasitic power circulation. However, when the effective tire radius 128 of the front tires 12 differs from the effective tire radius 130 of the rear tires 14 by a sufficient amount and the work vehicle 10 is traveling at a constant speed, the pair of tires with the larger effective tire radius typically operates in a driving mode while the pair of tires with the smaller effective radius typically operates in a sliding or braking mode due to differing amounts of tire slippage. As a result, the traction forces on the front and rear tires 12, 14 and, thus, the drive shaft torques of the front and rear drive shafts 116, 118 will be in opposite directions, thereby leading to parasitic power circulation. Specifically, the power flow circulates from the driving shaft to the driving tires, then from the driving surface to the vehicle frame, and finally from the braking tires to the opposite shaft.

As indicated above, in several embodiments, the controller 122 of the disclosed system 100 may be configured to function as a "soft sensor" for detecting parasitic power circulation within the drivetrain 102 of the work vehicle 10. Specifically, as will be described below, the controller 122 may be configured to determine or estimate power values associated with the power being transmitted through one or both of the drive shafts 116, 118 of the work vehicle 10 while the vehicle 10 is traveling at two or more different speeds. Based on the calculated or estimated power values, the controller 122 may then determine whether the work vehicle 10 is currently experiencing parasitic power circulation. In the event that it is determined that the work vehicle 10 is experiencing parasitic power circulation, the controller 122 may initiate a control action or strategy in response to such determination. For instance, the controller 122 may be configured to transmit a suitable control signal to cause a notification to be presented to the operator of the work vehicle that informs the operator of the current parasitic power circulation being experienced by the work vehicle 10 (e.g., by displaying the notification on a display panel with the cab 18 of the work vehicle 10 or by generating an audible message). Alternatively, the controller 122 may be configured to transmit suitable control signals to automatically adjust the operation of the work vehicle 10 (e.g., by controlling the operation of the engine 104 and/or the transmission 106) in response to the detection of parasitic power circulation.

In several embodiments, to detect whether the work vehicle 10 is currently experiencing parasitic power circulation, the controller 122 may be configured to compare a ratio of the determined power values to a predetermined relationship associated with operation of the work vehicle 10 when no parasitic power circulation is occurring. For instance, as indicated above, when the work vehicle 10 is traveling at a constant speed with no parasitic power circulation, the effective radii 128, 130 of the front and rear tires 12, 14 will be the same. In such instance, the drive shaft torques for the front and rear drive shafts 116, 118 may be expressed according to the following equations (Equations 1 and 2):

$$T_f = \frac{P_{tf}}{\omega_0} + C_{rr} * N_f * R_{eff} \qquad (1)$$

$$T_r = \frac{P_{lr}}{\omega_0} + C_{rr} * N_r * R_{eff} \quad (2)$$

wherein, $T_f$ corresponds to the torque on the front drive shaft 116, $T_r$ corresponds to the torque on the rear drive shaft 118, $P_{lf}$ corresponds to the parasitic power loss of the front axle 112, $P_{lr}$ corresponds to the parasitic power loss of the rear axle 114, $\omega_0$ corresponds to the output speed of the transmission 106, $C_{rr}$ corresponds to the coefficient of rolling resistance for the front and rear tires 12, 14, $N_f$ corresponds to the vertical load 132 on the front tires 12, $N_r$ corresponds to the vertical load 134 on the rear tires 14, and $R_{eff}$ corresponds to the effective radius of the front and rear tires 12, 14 (which, as indicated above, is assumed to be the same in this instance).

It should be appreciated that the various inputs to Equations 1 and 2 either correspond to constant values or values that can be readily determined or calculated by the controller 122. For instance, the parasitic power loss values for the axles 112, 114 (i.e., $P_{lf}$ and $P_{lr}$) may be determined by the controller 122 based on one or more axle efficiency tables that are stored within the controller's memory 126 or are otherwise accessible to the controller 122. Similarly, the output speed of the transmission 106 (i.e., $\omega_0$) may be based on feedback from any suitable sensor(s) that provides an indication of the transmission output speed. For instance, as shown in FIG. 2, in one embodiment, the controller 122 may be communicatively coupled to a speed sensor 136 configured to directly or indirectly monitor the output speed of the transmission 106. Additionally, the coefficient of rolling resistance, the vertical tire loads, and the effective tire radii (i.e., $C_{rr}$, $N_f$, $N_r$, $R_{eff}$) can be considered constants for purposes of the calculations and algorithms described herein.

Based on Equations (1) and (2), the power transmitted through the drive shafts 116, 118 may be expressed according to the following equation (Equation 3), which can also be solved for the transmission output speed (e.g., as indicated below in Equation 4):

$$P_{ds} = (T_f + T_r) * \omega_0 = (P_{lf} + P_{lr}) + C_{rr} * (N_f + N_r) * R_{eff} * \omega_0 \quad (3)$$

$$\omega_0 = \frac{P_{ds} - (P_{lf} + P_{lr})}{C_{rr} * (N_f + N_r) * R_{eff}} \quad (4)$$

wherein, $P_{ds}$ corresponds to the drive shaft power.

In addition, the drive shaft power (i.e., $P_{ds}$) can also be derived from the power balance formula for the work vehicle 10. For instance, in one embodiment, the drive shaft power may also be expressed according to the following equation (Equation 5):

$$P_{ds} = P_{engine} - P_{acc} - \Delta P_{tc} - P_{tl} \quad (5)$$

wherein, $P_{engine}$ corresponds to the engine power, $P_{acc}$ corresponds to the power consumption of the vehicle's power consuming accessories 120, $\Delta P_{tc}$ corresponds to the power loss across the torque converter 110, and $P_{tl}$ corresponds to the parasitic power loss of the transmission 106. It should be appreciated that the various power inputs to Equation 5 (i.e., $P_{engine}$, $P_{acc}$, $\Delta P_{tc}$, and $P_{tl}$) may, for example, by determined by the controller 122 based on monitored parameters or based on associated efficiency tables that are stored within the controller's memory 126 or are otherwise accessible to the controller 122. For example, the controller 122 may include separate efficiency tables for the power-consuming accessories 120, the torque converter 110, and the transmission 106, which may allow the various power inputs to Equation 5 to be determined quickly and efficiently.

Moreover, by combining Equations 4 and 5, the output speed of the transmission 106 may also be expressed according to the following equation (Equation 6):

$$\omega_0 = \frac{P_{engine} - P_{acc} - \Delta P_{tc} - P_{tl} - P_{lf} - P_{lr}}{C_{rr} * (N_f + N_r) * R_{eff}} \quad (6)$$

As indicated above, the coefficient of rolling resistance, the vertical tire loads, and the effective tire radii (i.e., $C_{rr}$, $N_f$, $N_r$, $R_{eff}$) are constants. Thus, with reference to Equation 6, if there is no parasitic power circulation, the ratio of the output speeds of the transmission 106 when the work vehicle 10 is traveling at two different speeds can be expressed according to the following equation (Equation 7):

$$\frac{\omega_{0(1)}}{\omega_{0(2)}} = \frac{P_{engine(1)} - P_{acc(1)} - \Delta P_{tc(1)} - P_{tl(1)} - P_{lf(1)} - P_{lr(1)}}{P_{engine(2)} - P_{acc(2)} - \Delta P_{tc(2)} - P_{tl(2)} - P_{lf(2)} - P_{lr(2)}} \quad (7)$$

wherein, $\omega_{0(1)}$ corresponds to a first output speed of the transmission 106, $\omega_{0(2)}$ corresponds to a different, second output speed of the transmission 106, $P_{engine(1)}$ and $P_{engine(2)}$ correspond to the engine power at the first and second transmission output speeds, respectively, $P_{acc(1)}$ and $P_{acc(2)}$ correspond to the power consumption of the vehicle's power consuming accessories 120 at the first and second transmission output speeds, respectively, $\Delta P_{tc(1)}$ and $\Delta P_{tc(2)}$ correspond to the power loss across the torque converter 110 at the first and second transmission output speeds, respectively, and $P_{tl(1)}$ and $P_{tl(2)}$ correspond to the parasitic power loss of the transmission 106 at the first and second transmission output speeds, respectively.

Based on the above-described assumptions, the ratio of the transmission output speeds and the ratio of the above-referenced power values provided above in Equation 7 generally define a relationship that holds true when the work vehicle 10 is not experiencing any parasitic power circulation when traveling at a constant speed. In contrast, when the work vehicle 10 is experiencing parasitic power circulation, Equation 7 will not be satisfied.

Figure 3:
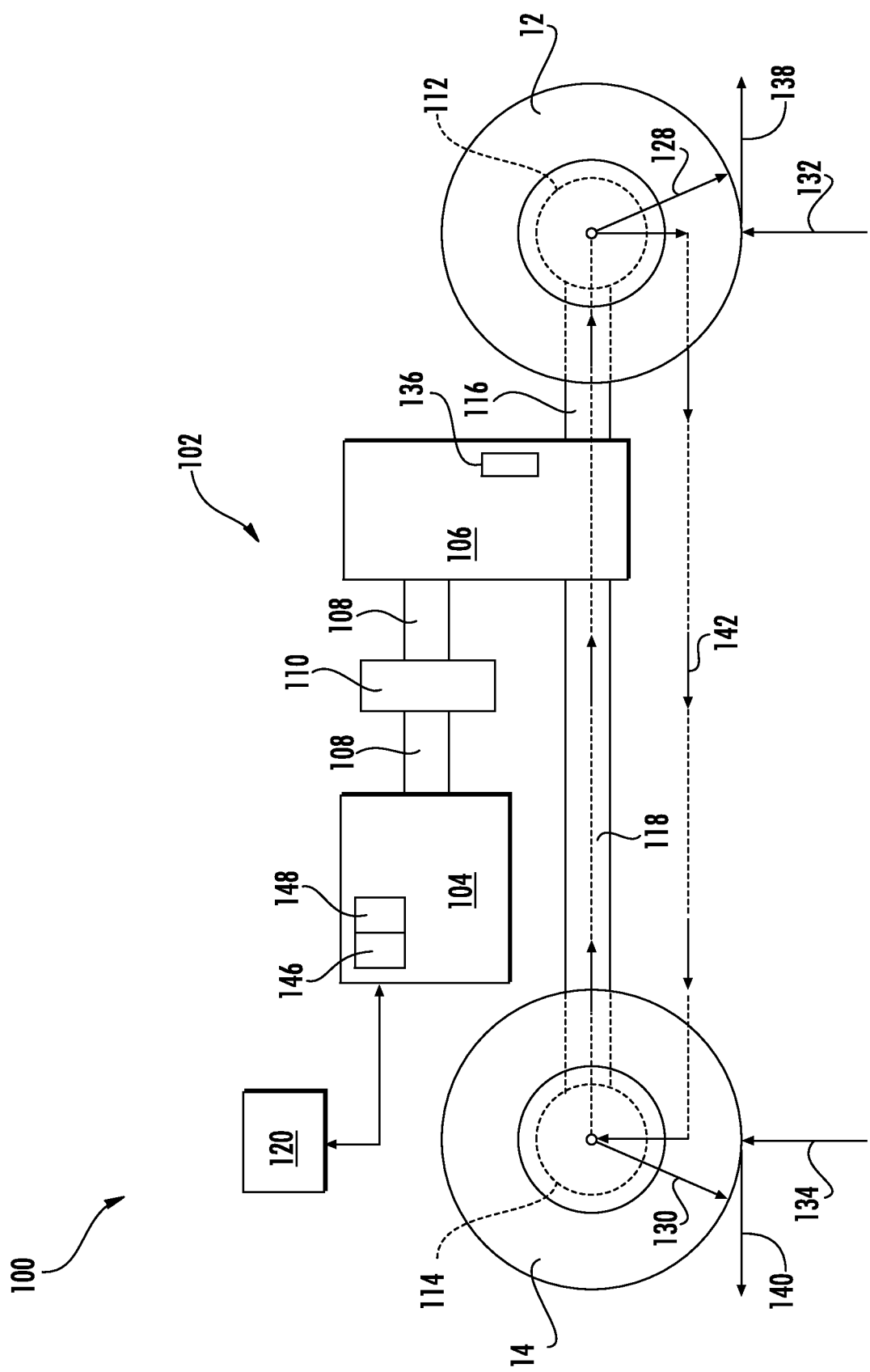
FIG. 3 illustrates a simplified, schematic view of the various drivetrain components shown in FIG. 2, particularly illustrating an instance in which the work vehicle is experiencing parasitic power circulation within the drivetrain in accordance with aspects of the present subject matter.

For instance, FIG. 3 illustrates a schematic view of the drivetrain components of the system 100 shown in FIG. 2 in which the front tires 12 define an effective tire radius 128 that differs from the effective tire radius 130 of the rear tires 14, thereby leading to parasitic power circulation within the drivetrain 102 (e.g., as indicated by loop 142 in FIG. 3). Specifically, for purposes of discussion, it may be assumed that the rear tires 14 have a smaller effective radius than the front tires 12 such that the front tires 12 are operating in a driving mode and the rear tires 14 are operating in a sliding or braking mode. Thus, when the vehicle 10 is traveling at a constant speed, the traction forces between the tires 12, 14 and the driving surface will be equal in a magnitude, but in opposite direction (e.g., as indicated by front traction force arrow 138 and rear traction force arrow 140 in FIG. 3). In such instance, in contrast to Equations 1 and 2 described above, the drive shaft torques for the front and rear drive shafts 116, 118 may be expressed according to the following equations (Equations 8 and 9):

$$T_f = \frac{P_{lf}}{\omega_0} + C_{rr} * N_f * R_f + F_t * R_f \qquad (8)$$

$$T_r = -\frac{P_{lr}}{\omega_0} - C_{rr} * N_r * R_r + F_t * R_r \qquad (9)$$

wherein, $T_f$ corresponds to the torque on the front drive shaft 116, $T_r$ corresponds to the torque on the rear drive shaft 118, $P_{lf}$ corresponds to the parasitic power loss of the front axle 112, $P_{lr}$ corresponds to the parasitic power loss of the rear axle 114, $\omega_0$ corresponds to the output speed of the transmission 106, $C_{rr}$ corresponds to the coefficient of rolling resistance for the front and rear tires 12, 14, $N_f$ corresponds to the vertical load 132 on the front tires 12, $N_r$ corresponds to the vertical load 134 on the rear tires 14, $R_f$ corresponds to the effective radius 128 of the front tires 12, $R_r$ corresponds to the effective radius 130 of the rear tires 14, and $F_t$ corresponds to the traction forces on the front and rear tires 12, 14.

Comparing Equations 8 and 9 to Equations 1 and 2, one of ordinary skill in the art will appreciate that the torque on the front drive shaft 116 will increase in magnitude while the torque on the rear drive shaft 118 will decrease in magnitude. Accordingly, based on Equations 8 and 9 and recognizing that the drive shaft torques are in opposite directions, the drive shaft power ($P_{ds}$) may be expressed according to the following equation (Equation 10):

$$P_{ds} = (T_f - T_r) * \omega_0 \approx \qquad (10)$$
$$(P_{lf} + P_{lr}) + C_{rr} * (N_f + N_r) * \frac{(R_r + R_f)}{2} * \omega_0 + F_t * (R_f - R_r) * \omega_0$$

Referring to Equation 10, it should be noted that the parasitic power term (i.e., $F_t*(R_f-R_r)*\omega_0$) corresponds to the additional load on the engine 104 due to the presence of parasitic power circulation. Moreover, by solving Equation 10 for the transmission output speed and by substituting the power balance equation for the drive shaft power, the transmission output speed can be expressed as the following equation (Equation 11) when the work vehicle 10 is experiencing parasitic power circulation:

$$\omega_0 = \frac{P_{engine} - P_{acc} - \Delta P_{tc} - P_{tl} - P_{lf} - P_{lr}}{C_{rr}*(N_f + N_r)* \frac{(R_f + R_r)}{2} + F_t*(R_f - R_r)} \qquad (11)$$

As is clear from Equation 11, when there is parasitic power circulation within the drivetrain 102 of the work vehicle 10, Equation 7 above will no longer be satisfied. As such, the ratios provided along either side of the Equation 7 can be used by the controller 122 to determine whether the work vehicle 10 is currently experiencing parasitic power circulation.

Figure 4:
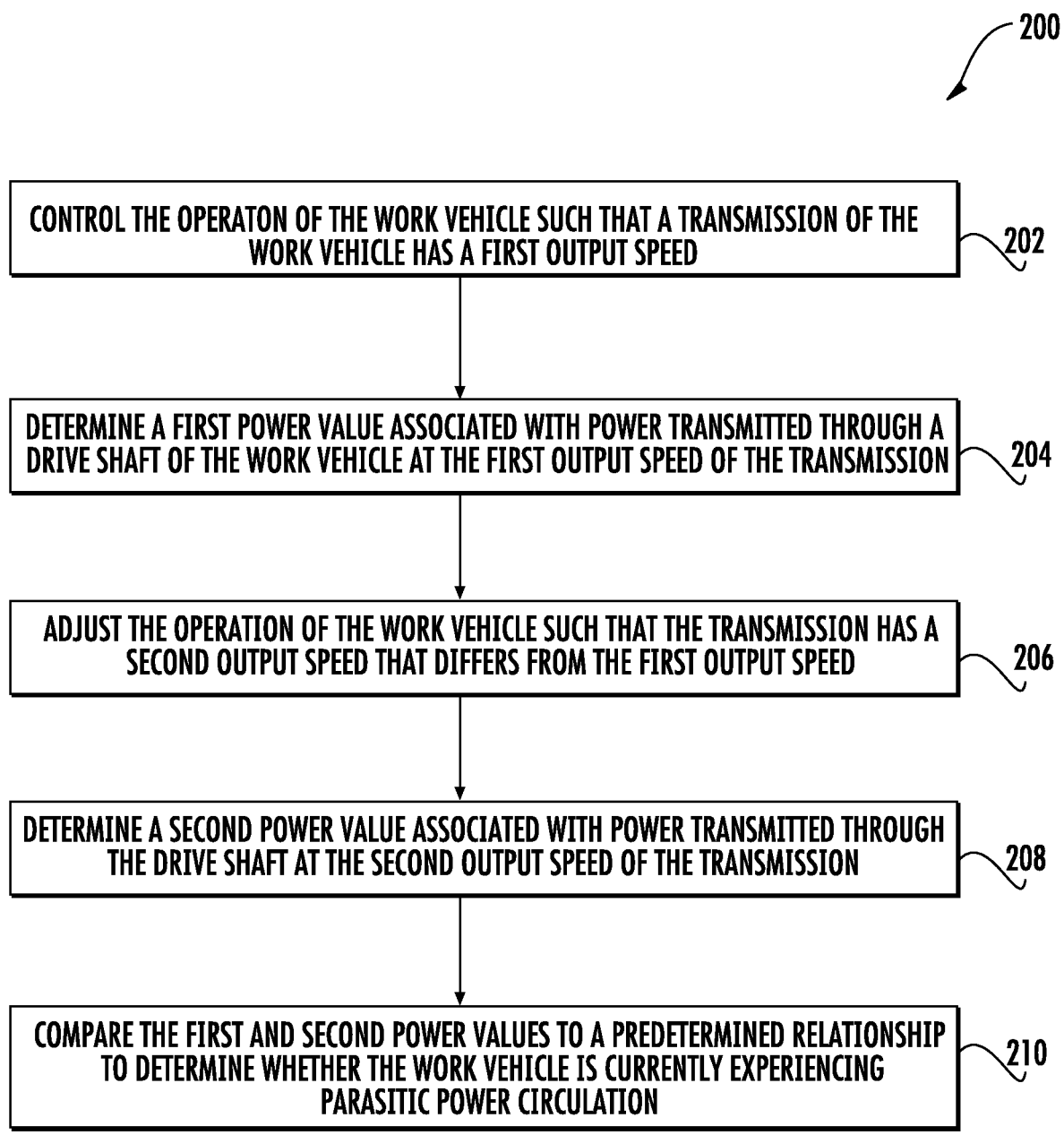
FIG. 4 illustrates a flow diagram of one embodiment of a method for detecting parasitic power circulation within a work vehicle in accordance with aspects of the present subject matter.

Referring now to FIG. 4, a flow diagram of one embodiment of a method 200 for detecting parasitic power circulation within a work vehicle is illustrated in accordance with aspects of the present subject matter. In general, the method 200 will be described herein with reference to the work vehicle 10 shown in FIG. 1, as well as the various system components shown in FIGS. 2 and 3. However, it should be appreciated that the disclosed method 200 may be implemented with work vehicles having any other suitable configuration and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include controlling the operation of the work vehicle such that a transmission of the work vehicle has a first output speed. For instance, as indicated above, the controller 122 may be configured to control the operation of the engine 104 and/or the transmission 106 of the work vehicle 10 to achieve a given transmission output speed and, thus, a given ground speed for the work vehicle 10.

Additionally, at (204), the method 200 may include determining a first power value associated with power transmitted through a drive shaft of the work vehicle at the first output speed of the transmission. In general, the first power value may correspond to any suitable power value that is associated with or indicative of the power transmitted through one or both of the drive shafts 116, 118 of the work vehicle 10. For example, in one embodiment, the first power value may correspond to the numerator of Equation 7 described above. In such an embodiment, the first power value may be expressed according to the following equation (Equation 12):

$$PV_{wo_1} = P_{engine(1)} - P_{acc(1)} - \Delta P_{tc(1)} - P_{tl(1)} - P_{lf(1)} - P_{lr(1)} \qquad (12)$$

wherein, $PV_{wo_1}$ corresponds to the first power value associated with the first output speed ($wo_1$).

Moreover, at (206), the method 200 may include adjusting the operation of the work vehicle such that the transmission has a second output speed that differs from the first output speed. Specifically, during operation of the work vehicle 10, the controller 122 may be configured to adjust the transmission output speed by controlling the operation of the engine 104 and/or the transmission 106. As such, when desired, the operation of the work vehicle 10 may be controlled to allow for the transmission output speed to be adjusted.

Referring still to FIG. 4, at (208), the method 200 may include determining a second power value associated with power transmitted through the drive shaft at the second output speed of the transmission. In general, the second power value may correspond to any suitable power value that is associated with or indicative of the power transmitted through one or both of the drive shafts 116, 118 of the work vehicle 10. For example, in one embodiment, the second power value may correspond to the denominator of Equation 7 described above. In such an embodiment, the second power value may be expressed according to the following equation (Equation 13):

$$PV_{wo_2} = P_{engine(2)} - P_{acc(2)} - \Delta P_{tc(2)} - P_{tl(2)} - P_{lf(2)} - P_{lr(2)} \qquad (13)$$

wherein, $PV_{wo_2}$ corresponds to the second power value associated with the second output speed ($wo_2$).

In addition, at (210), the method 200 may include comparing the first and second power values to a predetermined relationship to determine whether the work vehicle is currently experiencing parasitic power circulation. In several embodiments, the predetermined relationship may correspond to a relationship that is associated with operation of the work vehicle 10 without any parasitic power circulation. For instance, as indicated above, in one embodiment, the controller 122 may be configured to utilize the relationship of Equation 7 to determine when the work vehicle 10 is experiencing parasitic power circulation. In such an embodiment, the controller 122 may be configured to compare the ratio of the first and second transmission output speeds (i.e., the left side of Equation 7) to the ratio of the first and second power values determined at the respective output speeds (i.e., the right side of Equation 7). In the event that the ratio of the output speeds is the same as the ratio of the power values or if the difference between the ratios falls within a given tolerance range, the controller 122 may determine that the work vehicle 10 is not experiencing parasitic power circulation. However, if the ratio of the output speeds differs from the ratio of the power values by a predetermined amount (i.e., the difference falls outside the given tolerance range), the controller 122 may determine that the work vehicle 10 is experiencing parasitic power circulation due, for example, to a differential in the effective radii 128, 130 for the tires 12, 14.

As indicated above, when the controller 122 determines that the work vehicle 10 is experiencing parasitic power circulation (e.g., when the ratio of output speeds differs from the ratio of the power values by the predetermined amount), the controller 122 may be configured to implement a control action or strategy associated with addressing the parasitic power circulation. For example, in one embodiment, the controller 122 may be configured to transmit a suitable control signal to cause a notification to be presented to the operator of the work vehicle 10 that informs the operator of the current parasitic power circulation being experienced by the work vehicle 10 (e.g., by displaying the notification on a display panel with the cab 16 of the work vehicle 10 or by generating an audible message). Such a notification may, for instance, indicate that the parasitic power circulation derives from the difference in the effective tire radii 128, 130 for the tires 12, 14 and may instruct the operator to perform tire maintenance on one or more of the tires 12, 14 (e.g., by adjusting the tire pressure(s)) and/or to replace one or more of the tires 12, 14.

In another embodiment, the control action implemented by the controller 122 may be associated with adjusting the operation of the work vehicle 10. For instance, upon detection of parasitic power circulation, the controller 122 may be configured to transmit suitable control signals to automatically adjust the operation of the work vehicle 10 (e.g., by controlling the operation of the engine 104 and/or the transmission 106). Specifically, in one embodiment, the controller 122 may be configured to adjust the engine operation (e.g., by reducing engine speed or engine torque) in an attempt to negate the effects of the parasitic power circulation on the vehicle's drivetrain 102.

Figure 5:
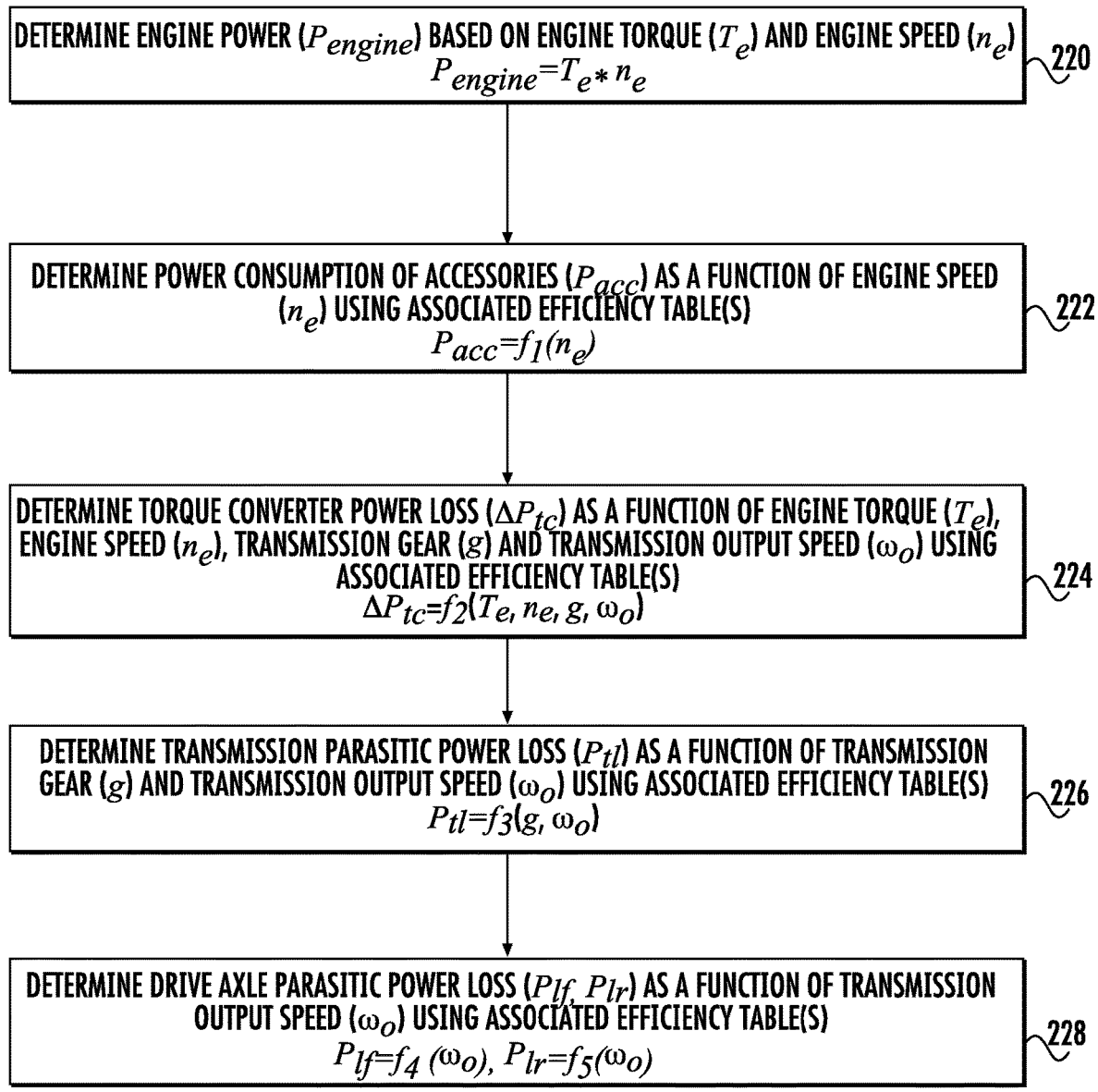
FIG. 5 illustrates a flow diagram of one embodiment of suitable steps that may be performed by a controller of the disclosed system when implementing the method shown in FIG. 4 in accordance with aspects of the present subject matter.

It should be appreciated that, when determining the power values described above, the controller 122 may be configured to utilize any suitable methodology and/or any suitable inputs or tables to calculate each associated power input value. For instance, FIG. 5 illustrates in one embodiment of a flow diagram that may be used by the controller 122 when determining the power input values included within Equations 12 and 13. It should be appreciated that, although FIG. 5 depicts steps performed in a particular order for purposes of illustration and discussion, the controller 122 may be configured to determine the power input values in any suitable order.

As shown in FIG. 5, at (220), the controller 122 may be configured to determine the engine power ($P_{engine}$) based on both the engine torque ($T_e$) and the engine speed ($n_e$), both of which may correspond to parameters monitored by the controller 122. For instance, as shown in FIG. 2, the controller 122 may be communicatively coupled to one or more engine sensors, such as a torque sensor 148 and/or a speed sensor 146, mounted on and/or within the engine 104 (and/or in operative association with an output shaft 108 of the engine 104) for monitoring the engine torque and the engine speed. Thus, based on the monitored engine torque and speed, the controller 122 may determine the engine power at any time during operation of the work vehicle 10.

Additionally, at (222), the controller 122 may be configured to determine the power consumption of the vehicle's power-consuming accessories 120 ($P_{acc}$) as a function of the engine speed ($n_e$). Specifically, in several embodiments, the controller 122 may include an efficiency table(s) stored within its memory 126 that relates the power consumption of each power-consuming accessory 120 to the engine speed. Thus, by monitoring the current engine speed, the controller 122 may calculate the accessory power consumption using the associated efficiency table(s).

Moreover, at (224), the controller 122 may be configured to determine the torque converter power loss ($\Delta P_{tc}$) as a function of the engine torque ($T_e$), the engine speed ($n_e$), the transmission gear (g) and transmission output speed ($\omega_O$). Specifically, in several embodiments, the controller 122 may include an efficiency table(s) stored within its memory 126 that relates the torque converter power loss to the engine torque, the engine speed, the transmission gear, and the transmission output speed. As is generally understood, the current transmission gear will be known to the controller 122. Thus, by monitoring the current engine torque, engine speed, and transmission output speed (e.g., via sensors 136, 146, 148), the controller 122 may calculate the torque converter power loss using the associated efficiency table(s).

Referring still to FIG. 5, at (226), the controller 122 may be configured to determine the transmission parasitic power loss ($P_{tl}$) as a function of the transmission gear (g) and the transmission output speed ($\omega_O$). Specifically, in several embodiments, the controller 122 may include an efficiency table(s) stored within its memory 126 that relates the transmission parasitic power loss to the transmission gear and the transmission output speed. Thus, by knowing the current transmission gear and by monitoring the current transmission output speed, the controller 122 may calculate the transmission parasitic power loss using the associated efficiency table(s).

In addition, at (228), the controller 122 may be configured to determine the parasitic power loss values for the front and rear drive axles 112, 114 ($P_{lf}$, $P_{lr}$) as a function of transmission output speed ($\omega_O$). Specifically, in several embodiments, the controller 122 may include an efficiency table(s) stored within its memory 126 that relates the parasitic power loss for each drive axle 112, 114 to the transmission output speed. Thus, by monitoring the current transmission output speed, the controller 122 may calculate the parasitic power loss values for the front and rear drive axles 112, 114 using the associated efficiency table(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting parasitic power circulation within a work vehicle, the method comprising:
controlling, with one or more computing devices, an operation of the work vehicle such that a transmission of the work vehicle has a first output speed;
determining, with the one or more computing devices, a first power value associated with power transmitted through a drive shaft of the work vehicle at the first output speed of the transmission;
adjusting, with the one or more computing devices, the operation of the work vehicle such that the transmission has a second output speed that differs from the first output speed;
determining, with the one or more computing devices, a second power value associated with power transmitted through the drive shaft at the second output speed of the transmission; and
comparing, with the one or more computing devices, the first and second power values to a predetermined relationship to determine whether the work vehicle is currently experiencing parasitic power circulation, the predetermined relationship being associated with operation of the work vehicle without parasitic power circulation.

2. The method of claim 1, further comprising determining a ratio of the first and second power values;
wherein comparing the first and second power values to the predetermined relationship comprises comparing the ratio of the first and second power values to the predetermined relationship to determine whether the work vehicle is currently experiencing parasitic power circulation.

3. The method of claim 2, wherein the predetermined relationship corresponds to a ratio of the first and second output speeds of the transmission.

4. The method of claim 2, further comprising, when the ratio of the first and second power values differs from the predetermined relationship by a predetermined amount, initiating a control action in response to determining that the work vehicle is currently experiencing parasitic power circulation.

5. The method of claim 4, wherein initiating the control action comprises transmitting a notification to an operator of the work vehicle that provides an indication that the work vehicle is currently experiencing parasitic power circulation.

6. The method of claim 4, wherein initiating the control action comprises automatically adjusting the operation of the work vehicle.

7. The method of claim 1, wherein the first and second power values are determined as a function of at least one of engine power, power consumption of one or more power-consuming accessories of the work vehicle, power loss across a torque converter of the work vehicle, parasitic power loss of the transmission, parasitic power loss of a front axle of the work vehicle, or parasitic power loss of a rear axle of the work vehicle.

8. The method of claim 7, wherein the first and second power values are determined according to the following equation:

$$PV = P_{engine} - P_{acc} - \Delta P_{TC} - P_{tl} - P_{lf} - P_{lr}$$

wherein, PV corresponds to either the first power value or the second power value, $P_{engine}$ corresponds to the engine power, $P_{acc}$ corresponds to the power consumption of the one or more vehicle accessories, $\Delta P_{TC}$ corresponds to the power loss across the torque converter, $P_{tl}$ corresponds the parasitic power loss of the transmission, $P_{lf}$ corresponds to the parasitic power loss of the front axle, and $P_{lr}$ corresponds to the parasitic power loss of the rear axle.

9. The method of claim 1, wherein the parasitic power circulation derives from a difference between an effective radius of front tires of the work vehicle and an effective radius of rear tires of the work vehicle.

10. The method of claim 9, wherein the parasitic power circulation is a function of the difference both between the effective radius of the front tires and the effective radius of the rear tires and a traction force acting on the front and rear tires.

11. The method of claim 1, wherein the work vehicle corresponds to a wheel loader.

12. A system for detecting parasitic power circulation within a work vehicle, the system comprising:
a drivetrain including an engine and a transmission operatively coupled to the engine, the drivetrain further including a front drive axle for delivering power from the engine to front tires of the work vehicle and rear drive axle for delivering power from the engine to rear tires of the work vehicle;
a controller including a processor and associated memory, the memory storing instructions that, when executed by the processor, configure the controller to:
control an operation of the work vehicle such that the transmission has a first output speed;
determine a first power value associated with power transmitted through at least one of the front drive shaft or the rear drive shaft at the first output speed of the transmission;
adjust the operation of the work vehicle such that the transmission has a second output speed that differs from the first output speed;
determine a second power value associated with power transmitted through the at least one of the front drive shaft or the rear drive shaft at the second output speed of the transmission; and
compare the first and second power values to a predetermined relationship to determine whether the work vehicle is currently experiencing parasitic power circulation, the predetermined relationship being associated with operation of the work vehicle without parasitic power circulation.

13. The system of claim 12, wherein the controller is further configured to determine a ratio of the first and second power values, the controller being configured to compare the ratio of the first and second power values to the predetermined relationship to determine whether the work vehicle is currently experiencing parasitic power circulation.

14. The system of claim 13, wherein the predetermined relationship corresponds to a ratio of the first and second output speeds of the transmission.

15. The system of claim 13, wherein, when the ratio of the first and second power values differs from the predetermined relationship by a predetermined amount, the controller is further configured to initiate a control action in response to determining that the work vehicle is currently experiencing parasitic power circulation.

16. The system of claim 15, wherein the controller is configured to initiate the control action by transmitting a notification to an operator of the work vehicle that provides an indication that the work vehicle is currently experiencing parasitic power circulation.

17. The system of claim 15, wherein the controller is configured to initiate the control action by automatically adjusting the operation of the work vehicle.

18. The system of claim 12, wherein the first and second power values are determined as a function of at least one of engine power, power consumption of one or more power-consuming accessories of the work vehicle, power loss across a torque converter of the work vehicle, parasitic power loss of the transmission, parasitic power loss of the front axle, or parasitic power loss of the rear axle.

19. The system of claim 12, wherein the parasitic power circulation derives from a difference between an effective radius of the front tires and an effective radius of the rear tires.

20. The system of claim 12, wherein the work vehicle corresponds to a wheel loader.

\* \* \* \* \*